United States Patent [19]

Vogelman et al.

[11] 3,736,368

[45] May 29, 1973

[54] TECHNIQUE FOR ENCODING AND DECODING T.V. TRANSMISSIONS BY MEANS OF A CODED ELECTRONIC TICKET

[75] Inventors: Joseph H. Vogelman, Roslyn; Will Baltin, Huntington; Ira Kamen, Lloyd Harbor, all of N.Y.

[73] Assignee: Theatre Vision, Inc., Woodbury, L.I., N.Y.

[22] Filed: Jan. 28, 1972

[21] Appl. No.: 221,700

[52] U.S. Cl.....................178/5.1, 325/32, 340/149 A

[51] Int. Cl................................................H04n 1/44

[58] Field of Search...................178/5.1, 22; 325/32, 325/122; 340/149 A

[56] References Cited

UNITED STATES PATENTS

| | | | |
|---|---|---|---|
| 3,387,083 | 6/1968 | Farber et al. | 178/5.1 |
| 2,671,165 | 3/1954 | Gilpin et al. | 325/32 |
| 3,387,265 | 6/1968 | Smeiman | 340/149 A |
| 3,531,582 | 9/1970 | Walker | 178/5.1 |

*Primary Examiner*—Benjamin A. Borchelt
*Assistant Examiner*—S. C. Buczinski
*Attorney*—Nichol M. Sandoe, Roy C. Hopgood, John M. Calimafde et al.

[57] ABSTRACT

A television program is transmitted at a carrier frequency outside the regular television reception channels. The subscriber-viewer is provided with a coded ticket which, when inserted into a receptacle, establishes a resonant frequency for a tuned circuit in that receptacle. The resonant frequency signal is processed to actuate a converter local oscillator which translates the carrier of the received program signal to a designated television channel of a conventional television receiver that is not normally employed for receiving broadcast television programs.

27 Claims, 7 Drawing Figures

TECHNIQUE FOR ENCODING AND DECODING T.V. TRANSMISSIONS BY MEANS OF A CODED ELECTRONIC TICKET

The present invention relates generally to communication receivers, and more particularly, to a home television system for use in viewing special program material after payment of a specified fee.

It has long been apparent that much of what is shown on television fails to satisfy a large number of discriminating viewers. In addition, the promoters of many events, such as certain athletic contests, first-run movies, plays and the like often optimize their profits by maintaining a limited audience for these events by not permitting them to be shown on the normal commercial television channels. As a result, individuals who for one reason or another resort primarily to television for their entertainment and enlightenment are often times deprived of an opportunity to participate as viewers in these events.

Several attempts have been made to fill this gap in the considerable potential of commercial television. Foremost of these at the present time is cable television transmission in which cables are run from a television transmitter to the homes of the viewer-subscribers who generally pay a monthly charge for the use of this service. The charge for cable-television service is normally fixed, that is, it is not proportional to the extent of viewing by the subscriber or to the types of programs selected by the subscriber. Programs not generally available over the normal television channels, such as certain cultural and sports events, are presently being made available to cable television subscribers.

Many events such as first-run moview are, however, not generally made available even to cable television subscribers as the resulting competition would keep patrons away from the movie theatres; the pro-rated cost to the subscriber would be much less than the price of the individual theatre ticket. Cable television subscribers must thus content themselves with viewing old movies and thus gain only a slight advantage, to wit, the absence of commercials, over viewers of commercial television.

Several attempts have been made in the past to utilize the home television receiver for the purpose of receiving special programs such as first-run movies. One of the most important of these involves the transmission of a scrambled television signal in which the video and / or audio portions of the transmitted signal are scrambled so as to be unintelligible when detected at the receiver. The viewer is provided with a coin-operated unscrambling device that is connected to his receiver, which upon the insert of a coin therein, unscrambles the video and audio portions of the program for a specified time and permits the unimpeded viewing of the selected program for that time. This system, however, requires the program originator to periodically collect the deposited coins from a collection receptacle located at the receiver. The need for the periodic coin collection is a nuisance to the subscriber and a source of waste and inefficiency to the program originator, and increases the costs of operation which are passed on to the subscriber. As a result, this coin-operated system has met with little success. Nor has any other pay-television system, for which the subscriber pays only for accepted programs rather than a flat rate as in cable television, met with any siginificant amount of acceptance.

It is an object of the invention to provide an improved pay television system in which the subscriber pays in advance for the privilege of viewing a specific program.

It is another object of the invention to provide a pay television system in which the actual attendance at a theatre is more closely simulated than in the known pay television systems.

It is a further object of the invention to provide a pay television system in which the collection of payments from the subscribers is more efficient, less burdensome, and less costly.

In accordance with the televsion system of the invention, the subscriber purchases in advance or otherwise obtains a coded "ticket" for each program that he wishes to view in his home. That program may be, for example, a first-run movie feature, an opera or theatrical performance, or prominent sports events. The system of the invention includes a receptacle or housing in which the ticket is inserted and which contains a tuned circuit. Upon insertion, the coded portion of the ticket varies the resonant frequency of the tuned circuit to establish a program select signal. The latter signal in turn is processed to actuate a converter oscillator operating at a selected converter frequency.

The television program is transmitted at a carrier frequency lying outside the band of a conventional UHF or VHF television receiver and thus cannot be received on a conventional receiver. The selected converter frequency produced in response to the insertion of the program select ticket as described above translates the broadcast carrier frequency to a designated, normally unused channel (e.g., VHF channel 6 or 12) so that the program can be viewed by the subscriber so long as the ticket is operative within the receptacle to produce the program select signal.

In another aspect of the invention the broadcast signal includes a termination signal at the completion of the program. Upon the detection of that signal at the receiver, the operation of the converter oscillator and accordingly reception at the designated channel are terminated. At this time, the ticket is automatically destroyed to permit the insertion of a new ticket when the subscriber wishes to view another preselected program.

To the accomplishment of the above and to such further objects as may hereinafter appear, the present invention relates to a technique for encoding and decoding T.V. transmission substantially as defined in the appended claims and as described in the following specification taken together with the accompanying drawings in which:

The present invention is directed toward a television receiver which has the capability of converting a normally unusable television signal into a designated channel that can be viewed by a subscriber who inserts a preselected coded "ticket" into the system.

Figure 1:
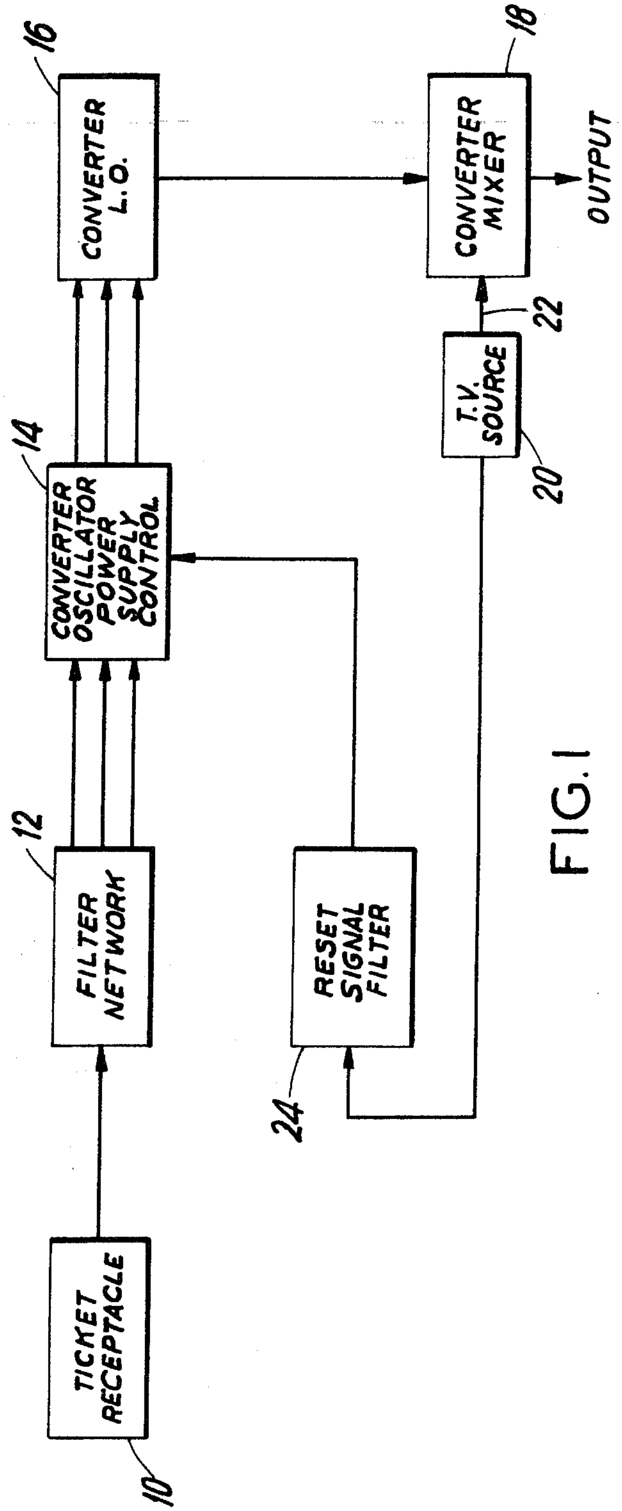
FIG. 1 is a schematic block diagram of a television receiver system in accordance with one embodiment of the invention.

As shown in FIG. 1, the ticket is inserted into a ticket receptacle or housing 10 which includes, as described more completely below with respect to FIG. 3, a tuned circuit. Also as described in greater detail below, the insertion of the ticket into receptacle 10 changes the resonant frequency of the tuned circuit to one of a predetermined number of frequencies in accordance with the nature of the coding on the ticket.

Figure 3:
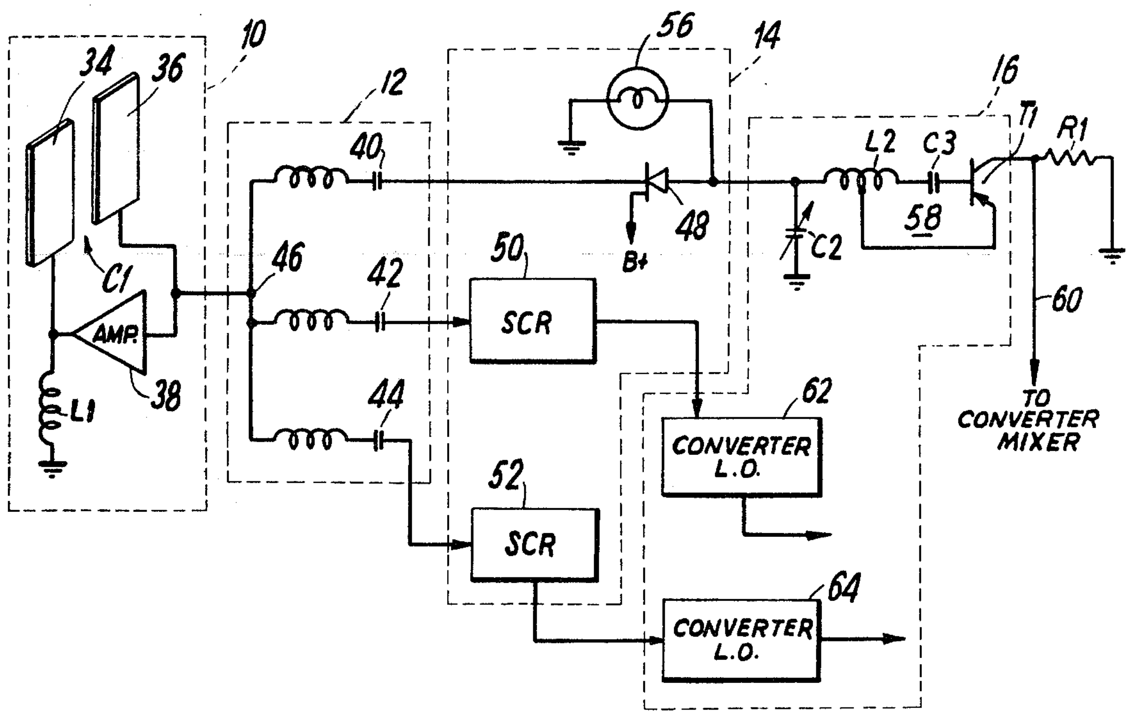
FIG. 3 is a schematic diagram illustrating in greater detail certain portions of the television receiver of FIG. 1.

The output of receptacle 10 is coupled to the input of a filter network 12 which includes, as shown in FIG. 3, a number of narrow-band or notch filters each of which is respectively centered at one of the possible resonant frequencies of the tuned circuit in receptacle 10.

The outputs of the filter network 12 are coupled to a converter oscillator power supply control circuit 14 which receives a signal from one of the filters in network 12 and in turn supplies a control signal to a converter local oscillator 16 to cause the latter to produce a signal at one of a number of specified converter frequencies. The output of converter oscillator 16 is coupled to one input of a converter-mixer 18, which receives at its other input the received television signal, here shown as being obtained from a television source 20. Source 20 may be a remote television transmitter coupled to the receiver through an air-link or cable 22. The output of mixer 18 is a television signal having a carrier frequency that is translated by the converter signal frequency to a designated television channel to which the receiver is tuned for viewing the selected program.

If desired, the transmitted program signal may also include an end-of-broadcast signal at a predetermined frequency such as a 100 kHz burst. The received television signal is also applied to a reset signal narrow band filter 24 that has an output coupled to oscillator control 14. The frequency pass band of filter 24 is centered at the frequency of the end-of-broadcast signal such that when that signal is received, it is coupled through filter 24 to reset power supply control 14 to thereby turn off the converter oscillator 16 and terminate reception at the viewing channel.

Figure 2:
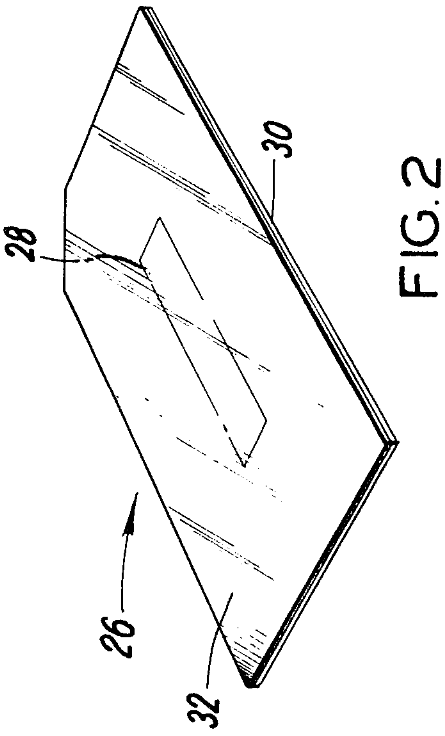
FIG. 2 is a perspective view of a card or "ticket" for use in the television receiver of the invention.

A typical ticket, for use in the receiver of FIG. 1 and as shown in FIG. 2, where it is generally designated 26, includes a metallic area 28 here shown as a single rectangular strip laminated between two dielectric sheets 30. Other metallic patterns may be provided on ticket 26 so long as the metallic pattern achieves the desired results as described below.

As shown in FIG. 3, ticket receptacle 10 includes a pair of spaced metallic plates 34 and 36 respectively coupled to the input and output of an amplifier 38. An inductance L1 is coupled between the input of amplifier 38 and ground. Plates 34 and 36 define a capacitor and together with inductance L1 define a frequency-determining tuned circuit for an oscillator that includes amplifier 38. In operation, ticket 26 is inserted into receptacle 10 in a manner such that metallic area 28 is introduced between, but insulated from, capacitor plates 34 and 36 to alter the effective tuned circuit capacitance in the oscillator circuit and thereby vary the output frequency of the oscillator. The variation in the frequency is determined by the configuration, to wit, the area, of the metallic coded pattern on the ticket such that the output frequency of the receptacle oscillator is representative of the ticket inserted into the ticket receptacle.

The oscillator in ticket receptacle 10 may, in the embodiment herein specifically shown, produce oscillation at one of three preselected frequencies in response to the insertion of a ticket into receptacle 10 having one of three possible configurations. The output of that oscillator is coupled to filter network 14 which, as shown in FIG. 3, includes three L-C filters 40, 42 and 44 at a common connection at 46. The pass band of each of filters 40–44 is centered at one of the frequencies that can be developed by the oscillator. The outputs of the filters are respectively coupled to the control gates of silicon-controlled rectifiers (SCR's) 48, 50 and 52. As illustrated with respect to SCR 48, the cathode of each of the SCR's is connected to a d.c. voltage source (not shown), and the anode of each SCR is coupled to one oscillating stage of converter local oscillator 16 to cause the oscillator to produce a converter signal at a specified frequency, which, as noted above, when mixed with the received television signal in mixer 18 translates the carrier frequency of the latter to derive the output signal at the desired channel frequency. A lamp 56 may, as shown, have one terminal connected to the anode of SCR 48 so that when the SCR is rendered conductive in the manner just described, the lamp will turn on to indicate operation of the receiver at a selected channel in response to the ticket insertion.

In the embodiment of the invention specifically shown in FIG. 3, each oscillating stage of oscillator 16, such as stage 58, includes a variable capacitor C2 connected between the anode of the SCR and ground. Also connected to the anode of the SCR is one terminal of an inductor L2, the other terimal of which is coupled through a capacitor C3 to the base of a ransistor T1. The collector of that transistor is connected to ground through a resistor R1, and its emitter is connected to a tap on inductor L2. The oscillator output that is applied to mixer 18 is taken from the collector of transistor T1 at a line 60.

As shown in FIG. 3, converter oscillator 16 also includes additional oscillator stages 62 and 64 respectively coupled to the anodes of SCR's 52 and 56. These stages are substantially identical to the oscillator stage 58, and are thus shown only in block form in FIG. 3. Converter oscillator stages 62 and 64 differ from each other and from stage 58 in that they oscillate at different predetermined frequencies when actuated in response to the actation of their associated SCR. One of oscillator stages 58, 62 and 64 is thus actuated in response to the conduction of the corresponding SCR, which in turn is determined by the signal passed by one of filters 40–44 and thus by the particular frequency produced at receptacle 10 in accordance with the metallic pattern provided on the inserted channel select ticket. The output of mixer 18 is thus the selected received television signal at the designated viewing channel frequency as desired.

Figure 4:
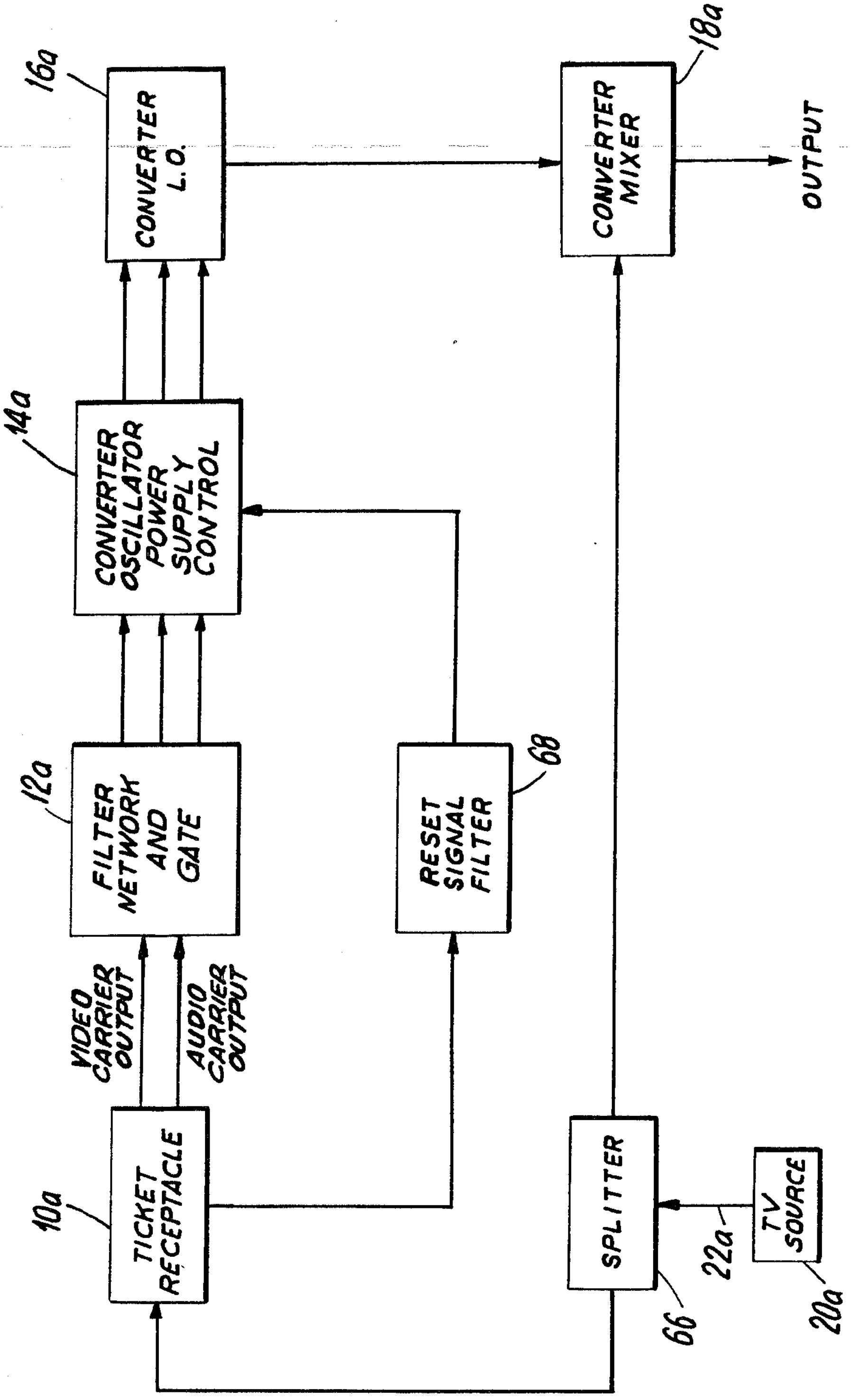
FIG. 4 is a schematic block diagram of a television receiver according to a second embodiment of the invention.

FIG. 4 illustrates in block form a variation of the receiver system of FIG. 1. Corresponding sections in the receiver of FIG. 4 are designated by corresponding reference numerals to those used in FIG. 1 with the suffix "*a*" appended thereto. In the embodiment of FIG. 4, the input television signal from source 20 rather than being applied directly to the mixer is applied to an RF splitter 66 which couples a portion of the received television signal to an input of ticket receptacle 10*a* which includes, as described below with reference to FIG. 5, a pair of tuned circuits each having a capacitance that is modified by different metallic patterns on the inserted ticket.

The outputs of receptacle 10*a* are applied to a filter network similar to that described above with respect to FIG. 3, and which further includes a series of AND gates for a purpose to be described. The circuit design of oscillator supply control 14*a*, oscillator 16*a*, and mixer 18*a* are substantially the same as the corresponding sections in the embodiment of FIG. 1 and are thus not further described herein.

The receiver of FIG. 4 also includes means in the form of a reset signal filter 68 to turn off or disable the converter oscillator 16*a* upon the completion of the selected television signal. As shown, filter 68 has an input coupled to ticket receptacle 10*a* and an output coupled to power supply control 14*a*. The received television signal contains an end-of-program signal or burst at a unique frequency, e.g., 100 kHz. Filter 68 has a narrow pass band centered at that frequency, such that the end-of-program signal is passed through filter 68 to power supply control 14*a* at which it is effective to disable the previously enabled SCR, to in turn remove the power supply voltage and thus disable the previously enabled stage of converter oscillator 16*a*. The turning off of the SCR in response to the end-of-program signal can be achieved in any one of several ways known to those skilled in the art, such as the temporary removal of the d.c. voltage from the cathode or anode of the SCR, and is not further described herein.

When oscillator 16*a* is thus disabled, reception at the selected channel is terminated and can only be renewed by the insertion of a new ticket into the ticket receptacle to reset the receiver for reception at a channel corresponding to the pattern on the newly inserted ticket. Filter 10*a* preferably includes a device (not shown) to mechanically destroy the previously inserted ticket upon the receipt and detection of the end-of-program signal.

Figure 5:
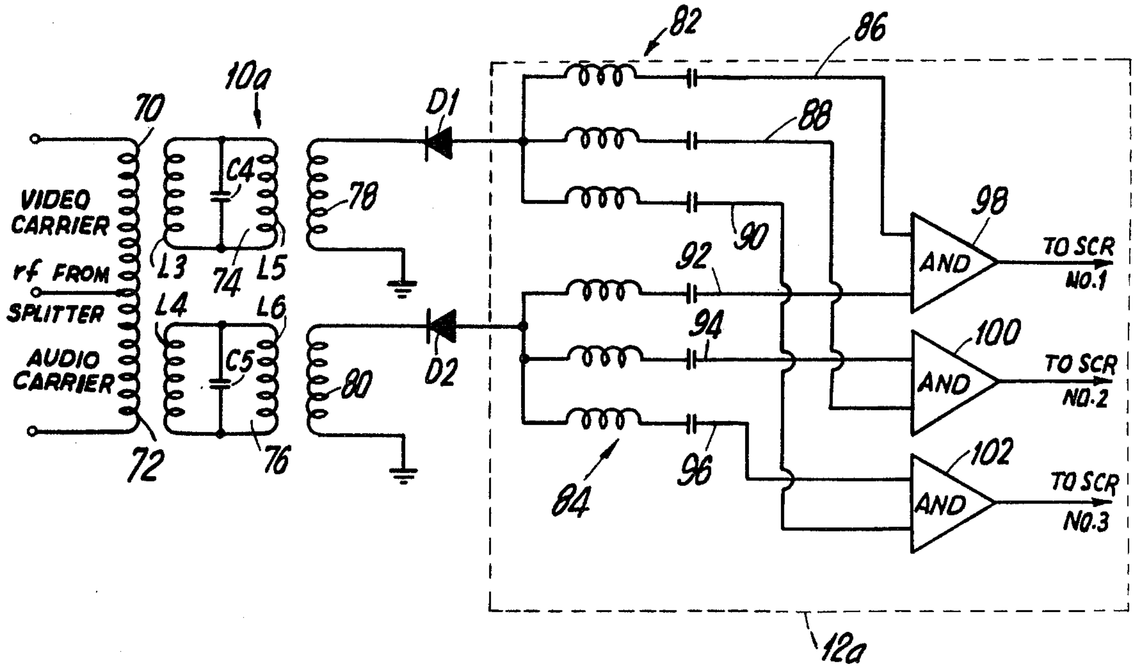
FIG. 5 is a schematic diagram of the tuned circuit of the receiver embodiment of FIG. 4.

The filter receptacle and AND gates of the embodiment of FIG. 4, as shown in greater detail in FIG. 5, includes a winding 70 to which the video carrier of the input television signal is applied from splitter 66, and a winding 72 to which the audio carrier of the received signal is applied. Tuned circuits 74 and 76 respectively include inductors L3 and L4 which are mutually coupled to input windings 70 and 72. Tuned circuits 74 and 76 also include capacitors C4 and C5 in respective parallel connection with inductors L3 and L4. The capacitance values of these capacitors are separately modified by different metallic areas on the inserted program select ticket. Also respectively connected in parallel with capacitors C4 and C5 are inductors L5 and L6, which are in turn respectively inductively coupled to windings 78 and 80.

One end of winding 78 is coupled through a diode D1 to a filter section 82 and its other end is connected to ground. Similarly, one end of winding 80 is coupled through a diode D2 to a filter section 84 and its other end is connected to ground. Filter section 82 includes three narrow pass filters 86, 88 and 90 each of which is centered at one of the anticipated input video carrier frequencies, and filter section 84 includes three narrow band-pass filters 92, 94 and 96 each of which is centered at one of the anticipated input audio carrier frequencies. The outputs of video filter 86 and audio filter 92 are coupled to the inputs of an AND gate 98. Similarly, the outputs of filters 88 and 94 are applied to the inputs of an AND gate 100, and the outputs of filters 90 and 96 are applied to the inputs of an AND gate 102.

In operation, the insertion of a properly coded ticket into receptacle 10a varies the values of capacitors C4 and C5 to establish the respective resonant frequencies of the tuned circuits including those capacitors to the video carrier and audio carrier frequencies of one of the possible received television program signals. The input video and audio carrier signals are respectively coupled through windings 78 and 80 to the filter sections 82 and 84. Those signals when present are passed through one of the filters in each of the filter sections to the inputs of one of the AND gates 98–102. When an audio and video signal are both present at the inputs of one of the AND gates, that gate will pass a signal to one of the SCRs in power supply control 14*a* to turn on one of the converter local oscillators in oscillator 16*a* in the manner described above. By the use of the circuits of FIGS. 4 and 5, a check may be made on the integrity of the ticket, which must contain two properly coded metallic areas for establishing the capacitances in both the audio and video tuned circuits to the proper value in order to produce converter local oscillator operation at the proper converter frequency to translate the received television signal to the viewing channel.

Figure 6:
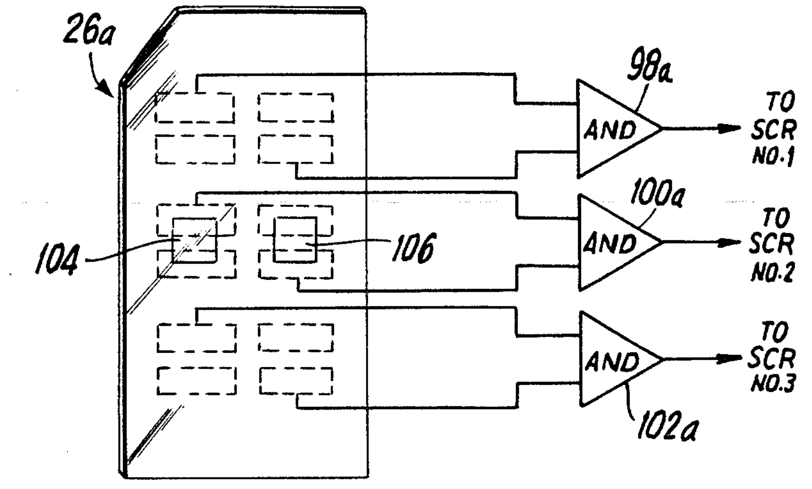
FIG. 6 is a schematic diagram illustrating the placement of the ticket with respect to a modification of the ticket receptacle of FIG. 4.

FIG. 6 illustrates a modification of the arrangement of FIG. 5, wherein, instead of the filter sections of the former, three pairs of tuned circuits, illustrated by the pairs of broken rectangles in FIG. 6, are included in the ticket receptacle. Each pair of tuned circuits is coupled to an AND gate 98*a*–102*a*. The program select ticket 26*a* includes a pair of metallic areas 104 and 106 insulated from one another and properly positioned on the ticket so that when the card is inserted into the receptacle, the metallic areas come into proximity to the capacitor plates of one of the pairs of tuned circuits in the ticket receptacle, to in turn allow that one pair of video and audio carriers to be passed to one of the AND gates to actuate one of the SCRs and converter local oscillators in the manner described above.

Figure 7:
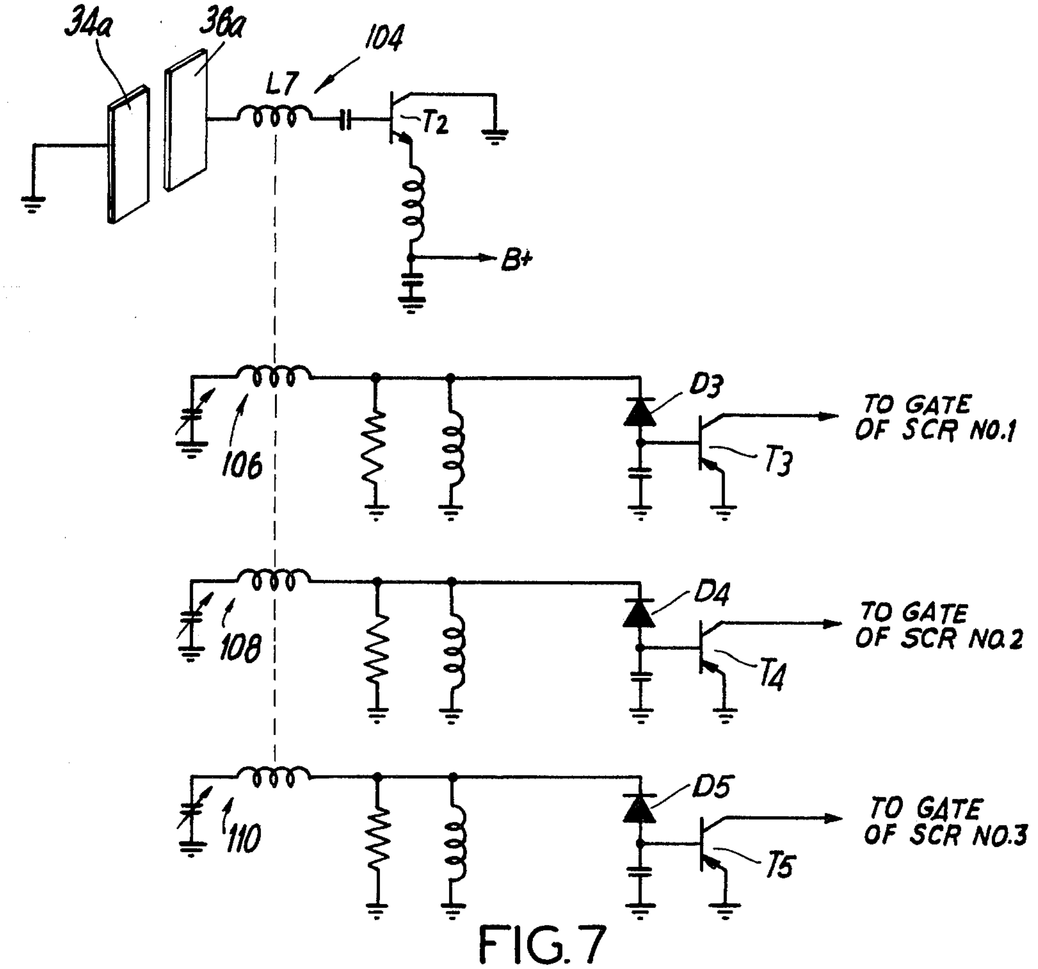
FIG. 7 is a schematic diagram of a modification of the first and second embodiments of the invention.

FIG. 7 illustrates a possible modification of the embodiment of FIG. 3, in which the narrow-band filters are not required. As shown therein, the capacitor plates 34*a* and 36*a* along with an inductor L7 constitute the tuned circuit of an oscillator 108, which includes a transistor T2 as the active element. That tuned circuit is inductively coupled, as indicated by the broken lines, to three other tuned circuits 110, 112 and 114. The resonant frequencies of these tuned circuits are different and each corresponds to one of the frequencies at which oscillator 108 may oscillate in response to the coding on the inserted program select ticket.

Tuned circuits 110–114 are respectively coupled through diodes D3, D4 and D5 to the bases of transistors T3, T4 and T5 all of which are connected in a grounded-emitter configuration. The collectors of these transistors are respectively connected to the gates of the oscillator power supply control SCR's. When one of the oscillator tuned circuits 110–114 is thus actuated, one of the transistors T3–T5 produces a turn-on pulse for the corresponding SCR.

The frequency of oscillator 108 as determined by the inserted program-select ticket and sensed by one of tuned circuits 110–114, is thereby effective to actuate one of the SCRs and translate the carrier frequencies of one of the three (for example) received television programs to the frequency of the designated reception channel.

The present invention thus enables a subscriber to select one of a plurality of transmitted television programs by the purchase and use of a coded "ticket." That ticket enables the subscriber to view a desired program such as a first-run movie at a convenient time in his own home by the prior purchase of the ticket. The ticket may be purchased in advance at a theatre or at any other outlet such as a super market, retail store, or the like, or it may be ordered and paid for through the mail. Tickets may be purchased individually or they may, if desired, be purchased in blocks, such as in a subscription, for use over a desired period of time, the subscriber being provided in advance with a schedule of programs for that period.

Whereas the invention has been herein specifically described with respect to certain embodiments thereof, modifications may be made therein without altering the scope of the invention. For example, each of the embodiments has been herein described with respect to a three-frequency receiver in which one of three converter oscillator frequencies is selected by the select ticket, to in turn translate a selected one of three received television signals. It is apparent that other numbers of available frequencies, including a single frequency arrangement, may also be employed to advantage depending on the number of selections that are made available to the subscribers. In addition, switching control devices other than SCR's herein specifically disclosed may be employed to control the operation of the converter local oscillators.

In the embodiment of FIG. 4 described above, the audio carrier frequency is employed in conjunction with a second conducting area provided on the program selector ticket to produce a second or certification signal to ensure that the selection of the program video carrier is achieved only as a consequence of the use of a bona-fide selector ticket. Other means of obtaining a certification signal may also be employed in conjunction with suitable filters in filter network **12*a*. For example, a separate c.w. carrier may be broadcast along with the television signal at a specified frequency associated with a certification area on the program select ticket. When the resonant frequency produced in receptacle 10*a* by the certification area on the program select ticket equals the frequency of the certification signal, an enabling signal is produced which along with the video carrier output signal from ticket receptacle 10a** causes the selected television program to be viewed on the designated channel in the manner described above.

In an alternate ticket certification procedure, a subcarrier such as at 15.750 kHz may be superimposed on the audio carrier. That subcarrier may then be modulated with a certification signal. When the program select ticket contains a coded area corresponding to the frequency of the modulated certification signal, the filter will pass the demodulated certification signal to enable the appropriate local oscillator and perform program selection as in the manner described above.

In the embodiments of the invention herein described, the ticket receptacle and filters are placed in the receiver ahead of the converter local oscillators so as to enable only one of the local oscillators and thereby permit the desired television signal to be viewed in accordance with the coded area on the program select ticket. If desired, each of the local oscillators may be enabled either sequentially or continuously, and the oscillator select signal produced in the ticket receptacle may be employed to pass the output of only a selected converter local oscillator to the mixer so that the output of the latter is at the desired channel frequency.

It is thus apparent that modifications may be made to the disclosed embodiments without necessarily departing from the spirit and scope of the invention.

What is claimed is:

1. A pay television receiver for viewing a television signal having a carrier frequency at a designated receiver channel at a frequency different than that of said carrier frequency, said receiver comprising means for receiving a program-selecting member having a first preselected conducting pattern thereon, said member receiving means comprising means including a second conducting pattern spaced from and electrically non-contacting said first conducting pattern when said member is received in said member receiving means for producing a first control signal having a control parameter representative of said first and second conducting patterns, normally deactuated local oscillator means for producing, when actuated, a mixing signal at a predetermined frequency, control means coupled to said control signal producing means and said local oscillator means, and responsive to said control parameter of said first control signal to produce an oscillator actuating signal for actuating said local oscillator means, and mixer means having one input coupled to said local oscillator means and receiving said television signal at another input for translating the carrier frequency of said television signal to a frequency for viewing at said designated receiver channel.

2. The receiver of claim 1, in which said member receiving means includes a tuned circuit including a fixed capacitance proportional to said second conducting pattern, the effective net capacitance of said tuned circuit being determined by the capacitance of said first conducting pattern and said fixed capacitance when said program-selecting member is received in said member receiving means, said control parameter of said first control signal being determined by said effective net capacitance.

3. The receiver of claim 2, in which said member comprises a generally rectangular insulating body, said conducting pattern including a metallic region on said insulating body.

4. The receiver of claim 3, in which said tuned circuit capacitance comprises at least one metallic plate, said metallic region on said member being in close proximity to but insulated from said metallic plate when said member is received in said member receiving means.

5. The receiver of claim 4, in which said control means includes a plurality of normally deactuated switching means, and further comprising frequency selecting means coupled between said member receiving means and said control means for selectively actuating one of said switching means in accordance with the frequency of said first control signal.

6. The receiver of claim 5, in which said local oscillator means comprises a corresponding plurality of oscillating stages respectively coupled to and actuated by said plurality of switching stages and capable when thus actuated to derive a mixing signal at one of a plurality of different preselected signals.

7. The receiver of claim 6, further comprising reset means coupled between said member receiving means and said control means for deactuating the previously actuated one of said switching means upon the receipt of an end-of-program signal in said television signal.

8. The receiver of claim 7, in which said reset means includes a filter having a narrow pass centered about the frequency of said end-of-program signal.

9. The receiver of claim 1, in which said member receiving means includes first and second tuned circuits having first and second capacitance members respectively, said coded pattern including first and second preselected conductive patterns for placement in respective proximity to said first and second capacitance members to establish the respective resonant frequencies of said first and second tuned circuits at the frequency of a certification signal and the video carrier frequency of said communications signal.

10. The receiver of claim 9, further comprising logic means coupled between said first and second tuned circuits and said control means for actuating the latter when said first and second tuned circuits are caused to be resonant at the frequencies of said certification signal and said video carrier.

11. The receiver of claim 10, further comprising filter means having pass bands centered at the frequencies of said audio and video carriers coupled between said first and second tuned circuits and said logic means.

12. The receiver of claim 1, in which said control means includes a plurality of normally deactuated switching means, and further comprising frequency selecting means coupled between said member receiving means and said control means for selectively actuating one of said switching means in accordance with the frequency of said first control signal.

13. The receiver of claim 12, in which said local oscillator means comprises a corresponding plurality of oscillating stages resepctively coupled to and actuated by said plurality of switching stages and capable when thus actuated to derive a mixing signal at one of a plurality of different preselected signals.

14. The receiver of claim 13, further comprising reset means coupled between said member receiving means and said control means for deactuating the previously actuated one of said switching means upon the receipt of an end-of-program signal in said communications signal.

15. The receiver of claim 14, in which said reset means includes a filter having a narrow pass centered about the frequency of said end-of-program signal.

16. The receiver of claim 1, further comprising reset means coupled between said member receiving means and said control means for deactuating the previously actuated one of said control means upon the receipt of an end-of-program signal.

17. The receiver of claim 16, in which said reset means includes a filter having a narrow pass centered about the frequency of said end-of-program signal.

18. A pay television receiver for receiving a television signal having a carrier outside a designated viewing channel, said receiver comprising means including a first conductive pattern for receiving a coded program-select member having a predetermined second conductive pattern thereon, said second conductive pattern being spaced from and electrically non-contacting said first conductive pattern when said member is received in said member receiving means, normally deactuated local oscillator means, means coupled to said member receiving means and to said local oscillator means for producing an oscillator control signal having a control parameter determined by said first and second conductive patterns, means responsive to said control parameter of said control signal for actuating said local oscillator means to cause the latter to produce a mixing signal at a selected frequency in response to the insertion of said program-select member into said member receiving means, and mixing means coupled to said local oscillator means and receiving said television signal and said mixing signal for translating upon the actuation of said local oscillator means the carrier frequency of said television signal to a frequency for viewing at said designated viewing channel.

19. The receiver of claim 18, in which said member receiving means includes a tuned circuit including a fixed capacitance, the value of the effective net capacitance of said tuned circuit being determined by the effective capacitance of said second conductive pattern and said fixed capacitance when said member is received in said member receiving means, the frequency of said first control signal being determined by said effective net capacitance.

20. The receiver of claim 19, in which said member comprises a generally rectangular insulating body, said second conductive pattern including a metallic region on said insulating body.

21. The receiver of claim 20, in which said tuned circuit capacitance comprises at least one metallic plate, said metallic region on said member being in close proximity to but insulated from said metallic plate when said member is received in said member receiving means.

22. The receiver of claim 18, further comprising reset means coupled between said member receiving means and said control means for deactuating the previously actuated one of said control means upon the receipt of an end-of-program signal.

23. The receiver of claim 22, in wiich said reset means includes a filter having a narrow pass centered about the frequency of said end-of-program signal.

24. The receiver of claim 21, further comprising reset means coupled between said member receiving means and said control means for deactuating the previously actuated one of said control means upon the receipt of an end-of-program signal.

25. A communications receiver for receiving a communications signal such as a television signal having a carrier outside a designated channel, said receiver comprising means including a first conductive pattern for receiving a coded member having a predetermined second conductive pattern thereon, said first and second conductive patterns being spaced from and electrically non-contacting one another when said member is received within said member-receiving means, a plurality of normally deactuated local oscillator means capable of producing mixing signals at different frequencies, means coupled to said member receiving means for producing an oscillator control signal having a control parameter determined by said first and second conductive patterns, means coupled to said control signal producing means for actuating one of said local oscillator means in response to said control parameter, and mixing means coupled to said local oscillator means and receiving the mixing signal from said one of said local oscillator means for translating the carrier frequency of said communications signals to a frequency for viewing at a designated viewing channel.

26. The receiver of claim 25, in which said member receiving means includes a tuned circuit including a capacitance, the value of said tuned circuit capacitance being proportional to said first and second conducting patterns when said coded member is received in said member receiving means.

27. The receiver of claim 26, in which said member comprises a generally rectangular insulating body, said second conducting pattern including a metallic region arranged on said insulating body.

* * * * *